O. B. SANDIFUR.
SNAP HOOK.
APPLICATION FILED APR. 24, 1913.
1,101,815.
Patented June 30, 1914.
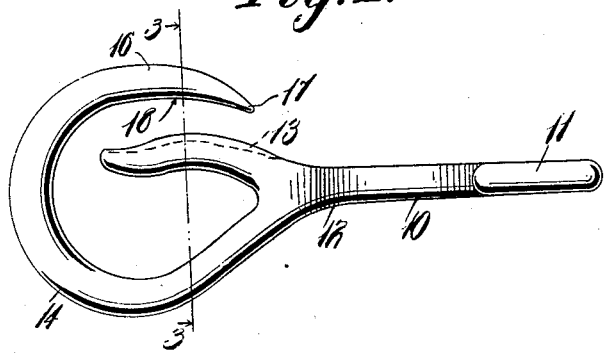
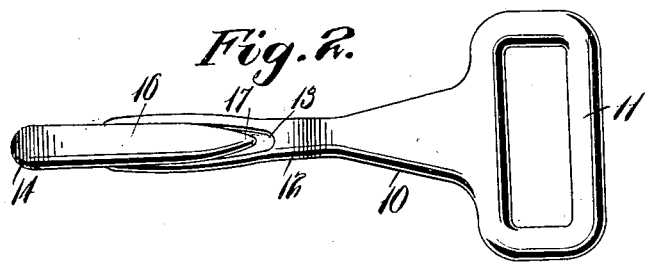
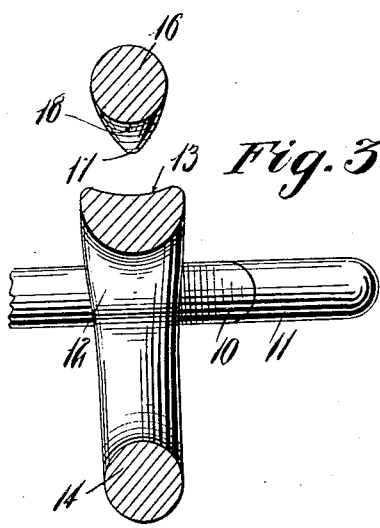
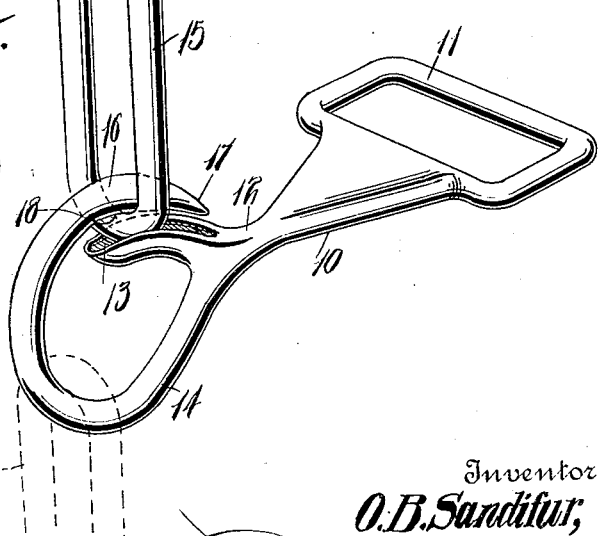
Witnesses
W. C. Fielding
L. N. Gillis
Inventor
O. B. Sandifur
By Chandlee & Chandlee
Attorneys
COLUMBIA PLANOGRAPH CO., WASHINGTON, D. C.

UNITED STATES PATENT OFFICE.

OLIVER B. SANDIFUR, OF NORTH MANCHESTER, INDIANA.

SNAP-HOOK.

1,101,815.  Specification of Letters Patent.  Patented June 30, 1914.

Application filed April 24, 1913.  Serial No. 763,385.

*To all whom it may concern:*

Be it known that I, OLIVER B. SANDIFUR, a citizen of the United States, residing at North Manchester, in the county of Wabash, State of Indiana, have invented certain new and useful Improvements in Snap-Hooks; and I do hereby declare the following to be a full, clear, and exact description of the invention, such as will enable others skilled in the art to which it appertains to make and use the same.

This invention relates to harness hooks and has for its object to provide a one piece hook free from springs and moving parts which is adapted to be used with an ordinary chain link and which will prevent said link becoming accidentally unhooked.

The invention consists, in general, of a harness hook having a throat arranged to permit the introduction of a chain link when the throat is held in one position with relation to the link and prevent the detachment of the link in any other position.

The invention further consists in certain novel details of arrangement and combination of parts hereinafter fully described, illustrated in the accompanying drawings, and specifically set forth in the claim.

In the accompanying drawings, like characters of reference indicate like parts in the several views, and Figure 1 is a side elevation of a hook constructed in accordance with this invention. Fig. 2 is a top plan view of such a hook. Fig. 3 is a section on the line 3—3 of Fig. 1 of a hook constructed in accordance with this invention. Fig. 4 is a perspective view of the hook showing the method of entering the links, the link being shown after engagement in dotted lines.

The numeral 10 indicates the body of the hook and this is provided at its rear end with a loop 11 adapted to receive a strap of a harness. The body 10 is prolonged to form a shank 12 and this shank is provided with an inclined concave face 13. Beyond the shank the hook is bent or otherwise constructed to form an eye 14 adapted to receive a link 15 of ordinary construction. The eye is extended backward along the shank of the hook as indicated at 16 and terminates in a point 17. That portion of the extended part 16 which lies adjacent the inclined face 13 of the shank is formed parallel to that face and is convex as shown at 18. The faces 13 and 18 are so spaced that they are a distance apart equal to the diameter to the metal of which the link 15 is made and the curvature of these faces is equal to that of the extreme end of said link. From this construction it will be apparent that in order to introduce the link 15 into the eye 14 it is necessary to turn the link so that it lies substantially at right angles to the plane of the opening between the surfaces 13 and 18, and to position said link so that the extreme end may be moved through that opening. In this position, the link may readily be slipped through the opening but when once through and turned down as indicated by the dotted lines in Fig. 4 it is impossible for the link to be accidentally detached inasmuch as this is the only position in which the link can be held to detach the same.

It will be observed that this hook is of extremely simple construction, consisting as it does of but a single piece, and that it holds the links in a very secure manner while at the same time permitting the ready engagement and removal of said links from the eye when this engagement or removal is intentionally performed. There has thus been provided a simple and efficient device of the character described and for the purpose specified and one which may be readily manufactured and at a low cost.

Having thus described the invention, what is claimed as new, is:—

A harness hook consisting of a rigid integral structure provided with a link receiving throat of concavo convex cross section and an eye opening therefrom in combination with a link of uniform cross sectional dimensions throughout and having an end adapted to pass along said throat when the link is held at right angles thereto.

In testimony whereof, I affix my signature, in presence of two witnesses.

OLIVER B. SANDIFUR.

Witnesses:
U. R. HOWENSTINE,
F. P. FREEMAN.